United States Patent
Lauffer et al.

(10) Patent No.: US 8,677,885 B2
(45) Date of Patent: Mar. 25, 2014

(54) FLOATING PISTON ACTUATOR FOR OPERATION WITH MULTIPLE HYDRAULIC SYSTEMS

(75) Inventors: John Lauffer, Santa Clarita, CA (US); Rhett Henrickson, Palmdale, CA (US)

(73) Assignee: Woodward HRT, Inc., Santa Clarita, CA (US)

( * ) Notice: Subject to any disclaimer, the term of this patent is extended or adjusted under 35 U.S.C. 154(b) by 832 days.

(21) Appl. No.: 12/904,687

(22) Filed: Oct. 14, 2010

(65) Prior Publication Data
US 2012/0090459 A1   Apr. 19, 2012

(51) Int. Cl.
*F15B 15/14*   (2006.01)

(52) U.S. Cl.
USPC ................. 91/510; 91/509; 244/99.4

(58) Field of Classification Search
USPC ....... 91/508, 509, 510, 216 R, 217; 244/99.2, 244/99.4, 99.5, 99.6
See application file for complete search history.

(56) References Cited

U.S. PATENT DOCUMENTS

| | | | |
|---|---|---|---|
| 3,242,822 A * | 3/1966 | Barltrop | 91/509 |
| 4,257,311 A * | 3/1981 | Barnsley et al. | 91/510 |
| 4,987,927 A | 1/1991 | Kluczynski | |
| 6,546,957 B2 | 4/2003 | Hajek, Jr. | |
| 6,981,439 B2 * | 1/2006 | Hart | 91/509 |
| 7,882,778 B2 * | 2/2011 | Fenny et al. | 91/509 |
| 2005/0132877 A1 | 6/2005 | Hart | |
| 2009/0229694 A1 | 9/2009 | Fenny et al. | |

FOREIGN PATENT DOCUMENTS

| | | |
|---|---|---|
| DE | 102006028878 A1 | 12/2007 |
| WO | 2006088488 A2 | 8/2006 |

* cited by examiner

*Primary Examiner* — Thomas E Lazo
(74) *Attorney, Agent, or Firm* — BainwoodHuang

(57) ABSTRACT

A floating piston actuator for use with multiple hydraulic systems includes a housing and a piston assembly. The piston assembly includes an elongate shaft or ram, at least one secured piston coupled to the ram, and a set of moveable pistons moveably disposed within the housing chamber on the ram such that the set of moveable pistons are translatable relative to a longitudinal axis of the ram. The set of moveable pistons form at least three hydraulically separate actuator cylinders where each of the three hydraulically separate actuator cylinders are disposed in fluid communication with a corresponding pressurized fluid source. The floating piston actuator allows hydraulic redundancy while maintaining a similar length compared to existing multi-system actuators. The floating pistons can be arranged in multiple configurations to allow operation with a hydraulic system failure without force fight or binding and with a higher output force than conventional multi-system actuators.

20 Claims, 12 Drawing Sheets

FLOATING PISTON ACTUATOR FOR OPERATION WITH MULTIPLE HYDRAULIC SYSTEMS

BACKGROUND

In fixed wing and rotary wing such as helicopters, a pilot causes the aircraft to undergo flight maneuvers via a hydraulic actuator. Typically, a hydraulic boost device multiplies or boosts the pilot's input forces to adjust a flight control surface, such as wing flap or rotor blade, to provide a relatively large mechanical advantage to the pilot when altering flight control surfaces or rotor blade pitch. For example, as the pilot provides a small amount of force (e.g., about 0.5 pounds force) on a set of mechanical linkages, the hydraulic boost device provides a relatively large force (e.g., 2,000-5,000 pounds force) on the corresponding flight control surface.

Conventional hydraulic boost devices are designed to avoid flight-critical failure modes. Typically in helicopter or aircraft systems, multiple hydraulic actuators are structurally or mechanically linked together to provide redundancy. Such redundancy allows for continued safe flight of the helicopter in the event that a portion of a hydraulic system driving a hydraulic actuator fails during operation.

FIG. 1 illustrates one type of hydraulic actuator system 10 utilized to provide dual redundancy for flight controls. As illustrated, the hydraulic actuator system 10 includes two separate hydraulic cylinders 12, 14 positioned in either a side-by-side arrangement, as shown, or in an inline tandem arrangement. A dedicated control valve 16 and hydraulic system 20 controls the first hydraulic cylinder 12 while a dedicated control valve 18 and hydraulic system 22 controls the second hydraulic cylinder 14. Both the control valve 16, 18 and the corresponding cylinder 12, 14 are structurally connected and perform identical functions for dual redundancy. In use, as a pilot actuates a lever 24, the lever 24 positions a valve member 26 of the first and second control valves 16, 18 to control the flow of pressurized fluid from the hydraulic systems 20 and 22 to the hydraulic cylinders 12, 14, thereby controlling the positioning of a flight control surface via the rod end 28. In the event one of one of the hydraulic systems 20 or 22 were to develop a leak or pump failure and system pressure were lost, the remaining functioning control valve and hydraulic system provides pressurized fluid to the corresponding hydraulic cylinder to allow for continued operation. The use of a dual and independent hydraulic actuator system 10 provides for a relatively high degree of safety by allowing the pilot to control the aircraft in the event of failure of a portion of the hydraulic actuator system 10.

FIG. 2 illustrates another type of hydraulic actuator system 50 utilized to provide dual redundancy. As illustrated, the hydraulic actuator system 50 includes a single hydraulic cylinder 52 with a single control valve 54. The hydraulic actuator system 50 also includes first and second hydraulic systems 56, 58 in fluid communication with the hydraulic cylinder 52 via a switching valve 60. The switching valve 60 provides failover redundancy in the hydraulic actuator system 50. For example, the switching valve 60 is disposed in a first compressed position relative to the control valve 54, as illustrated, to allow pressurized fluid to flow between the first hydraulic system 56 and the hydraulic cylinder 52. As a pilot actuates a lever 62, the lever 62 adjusts a position of a valve member 64 of the control valve 54 to control the flow of pressurized fluid from the first hydraulic system 56 to the hydraulic cylinder 52. In turn, the hydraulic cylinder 52 controls the positioning of rod end 68. In the event that the hydraulic system 56 were to develop a failure, the switching valve 60 moves to a second, extended position via spring 70 to allow pressurized fluid to flow between the second hydraulic system 58 and the hydraulic cylinder 52. The use of the single control valve 54 in combination with the switching valve 60 provides the system 50 with a level of redundancy at a relatively low cost and low weight.

SUMMARY

Conventional hydraulic actuator systems suffer from a variety of deficiencies. For example, the hydraulic actuator system 10 of FIG. 1 increases the overall weight and cost of the system 10 since each of the hydraulic cylinders 12, 14 are duplicated and must be sized to provide the required output force with only one system operating. Accordingly, each hydraulic cylinder 12, 14 is required to produce twice the force necessary to actuate a flight control surface, such as a rotor. For example, assume an output of 2,000 pounds force is required to control a flight control surface. Each of the hydraulic cylinders 12, 14 must be sized to provide 2,000 pounds force to control actuation of the rotor and with both hydraulic systems operational, twice the required force is produced. The supporting aircraft structure and linkages thus must be designed to support twice the needed force, a total of 4,000 pounds force, and to withstand the large force output when both hydraulic cylinder 12, 14 are operational.

In another example, the hydraulic system 50 of FIG. 2 includes a single hydraulic cylinder 52 with a single control valve 54 where one of the first and second hydraulic systems 56, 58 provides pressurized fluid to the hydraulic cylinder 52 by a switching valve 60. While the use of a single hydraulic cylinder 52 and single control valve 54 reduces the weight and the costs associated with the hydraulic system 50, the use of the single switching valve 60 can reduce system safety because of the transient produced when switching from one system to another. The failure of one system, such as the first hydraulic system 56 must be sensed, confirmed and shut off and the other system, such as the second hydraulic system 58 switched in quickly to re-gain control of the flight control surface. However, the single control valve 54 does not meet current Federal Aviation Administration (FAA) requirements of an independent control valve. The FAA has deemed such a configuration as unacceptable for critical flight control applications because, in the event that the switching valve 60 was to fail during operation, the entire system could become inoperable.

Additionally, each of the hydraulic systems 10, 50 of FIGS. 1 and 2, respectively, are configured to provide only dual redundancy to a helicopter or aircraft system. For example, for system 10, in the event one of the hydraulic systems 20 or 22 was to develop a leak or pump failure and system pressure were lost, the remaining functioning control valve and hydraulic system provides pressurized fluid to the hydraulic cylinder to allow for continued operation. Also, for system 50, in the event that the first hydraulic system 56 were to develop a failure, the system 50 allows pressurized fluid to flow between the second hydraulic system 58 and the hydraulic cylinder 52. However, in either case with only one hydraulic system remaining, inadvertent failure of the second hydraulic system would be catastrophic as the pilot would be unable to continue to operate of the aircraft. Accordingly, after the failure of a hydraulic system, air regulations require the pilot to land the aircraft for repairs. However, in certain cases, such as during trans-oceanic flights, a pilot may be unable to comply with such requirements, thereby leaving himself and his aircraft exposed to potentially catastrophic failure.

By contrast to conventional hydraulic systems, embodiments of the present invention relate to a floating piston actuator for use with multiple hydraulic systems includes a housing and a piston assembly. The piston assembly includes an elongate shaft or ram, at least one secured piston coupled to the ram, and a set of moveable pistons moveably disposed within the housing chamber on the ram such that the set of moveable pistons are translatable relative to a longitudinal axis of the ram. The set of moveable pistons form at least three hydraulically separate actuator cylinders where each of the three hydraulically separate actuator cylinders are disposed in fluid communication with a corresponding pressurized fluid source. The floating piston actuator allows hydraulic redundancy while maintaining a similar length compared to existing multi-system actuators. The floating pistons can be arranged in multiple configurations to allow operation with a hydraulic system failure without force fight or binding and with a higher output force than conventional multisystem actuators. Accordingly, the present configuration of the hydraulic actuator allows for lighter weight aircraft structure and linkage hardware, thereby providing optimal sizing for an aircraft. Additionally, it should be noted that the fluid connections between the floating piston actuator and the pressurized fluid sources can be made in a variety of ways and that the floating piston concept can be applied to manual or fly-by-wire actuation systems.

In one arrangement, the floating piston actuator can also reduce the difference in an actuator's output force when hydraulic system failure modes. For example, if a traditional actuator were to lose two of its three hydraulic systems, the actuator would lose two-thirds of its output force. By contrast, the floating piston actuator is configured such that if two of the three associated hydraulic systems become inoperative, the floating configuration only loses about one-half of its output force. This is accomplished due to the fact that the floating piston actuator has a constant output with one or two systems operating.

In one arrangement, a hydraulic actuator includes an elongate shaft and a housing defining a housing chamber, at least a portion of the elongate shaft being disposed within the housing chamber. The housing configured to translate relative to the elongate shaft to control positioning of a variable-geometry element associated with an aircraft. The hydraulic actuator includes at least one secured piston coupled to the elongate shaft and disposed within the housing chamber. The hydraulic actuator includes a set of moveable pistons moveably disposed within the housing chamber on the elongate shaft. The housing, the at least one secured piston, and the set of moveable pistons define (i) a first set of actuator volumes configured to be disposed in fluid communication with a first pressurized fluid source, (ii) a second set of actuator volumes configured to be disposed in fluid communication with a second pressurized fluid source, and (iii) a third set of actuator volumes configured to be disposed in fluid communication with a third pressurized fluid source.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Embodiments of the present invention relate to a floating piston actuator for use with multiple hydraulic systems includes a housing and a piston assembly. The piston assembly includes an elongate shaft or ram, at least one secured piston coupled to the ram, and a set of moveable pistons moveably disposed within the housing chamber on the ram such that the set of moveable pistons are translatable relative to a longitudinal axis of the ram. The set of moveable pistons form at least three hydraulically separate actuator cylinders where each of the three hydraulically separate actuator cylinders are disposed in fluid communication with a corresponding pressurized fluid source. The floating piston actuator allows hydraulic redundancy while maintaining a similar length compared to existing multi-system actuators. The floating pistons can be arranged in multiple configurations to allow operation with a hydraulic system failure without force fight or binding and with a higher output force than conventional multisystem actuators. Accordingly, the present configuration of the hydraulic actuator allows for lighter weight aircraft structure and linkage hardware, thereby providing optimal sizing for an aircraft.

Figure 1:
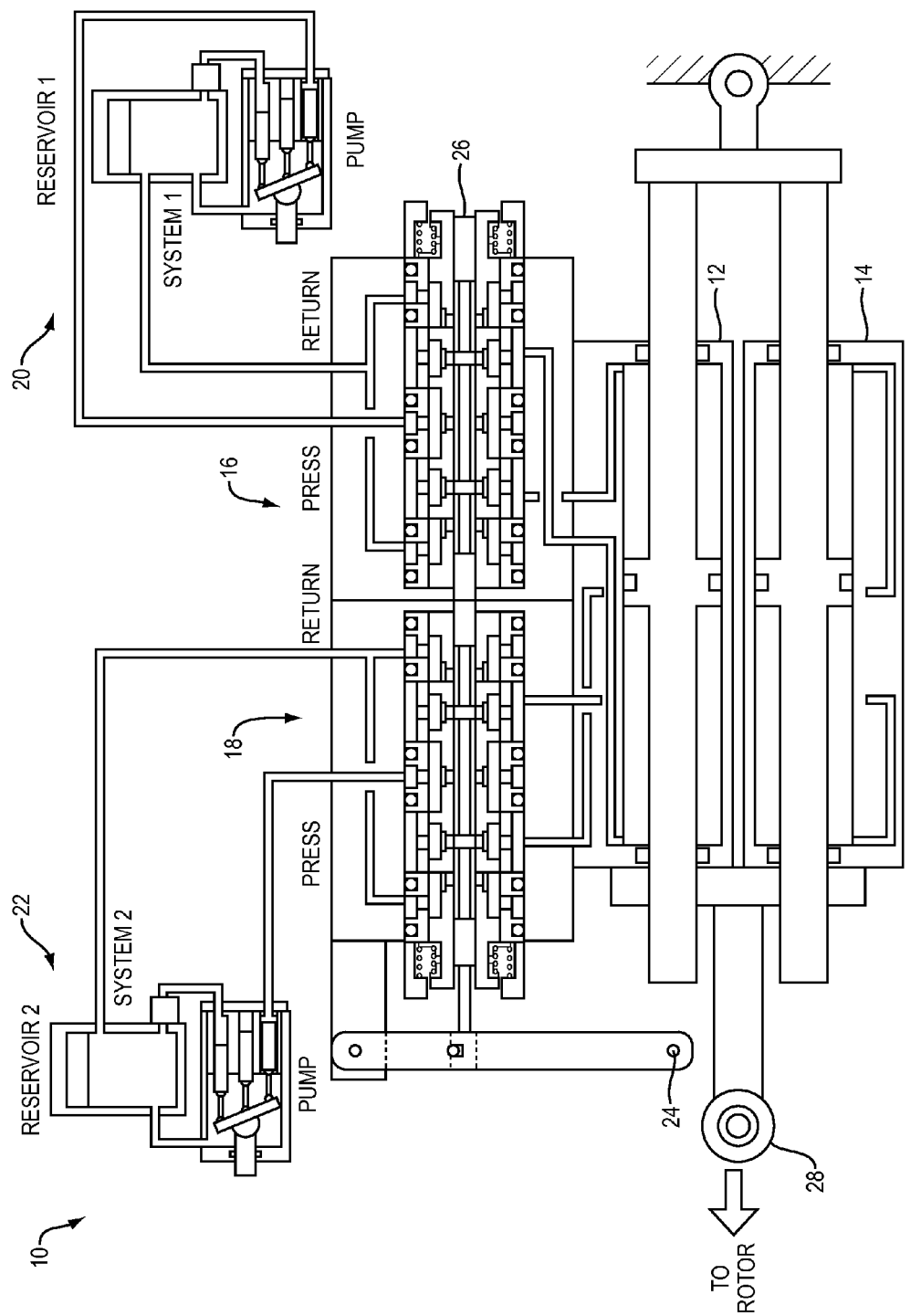
FIG. 1 illustrates a prior art hydraulic actuator system having dual hydraulic cylinders with dual hydraulic systems.
Figure 2:
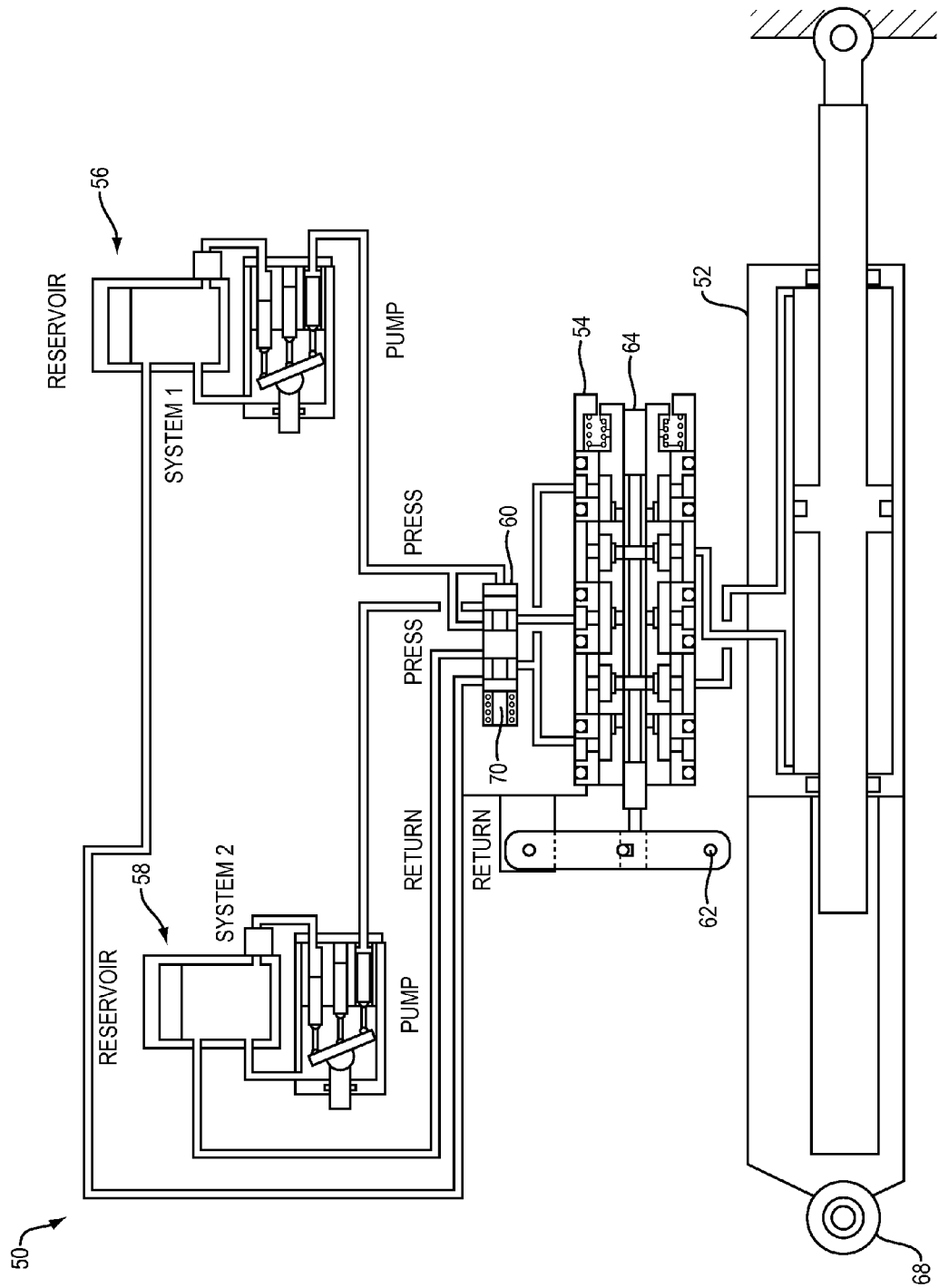
FIG. 2 illustrates a prior art hydraulic actuator system having a single hydraulic cylinder and a switching valve disposed between dual hydraulic systems.
Figure 3:
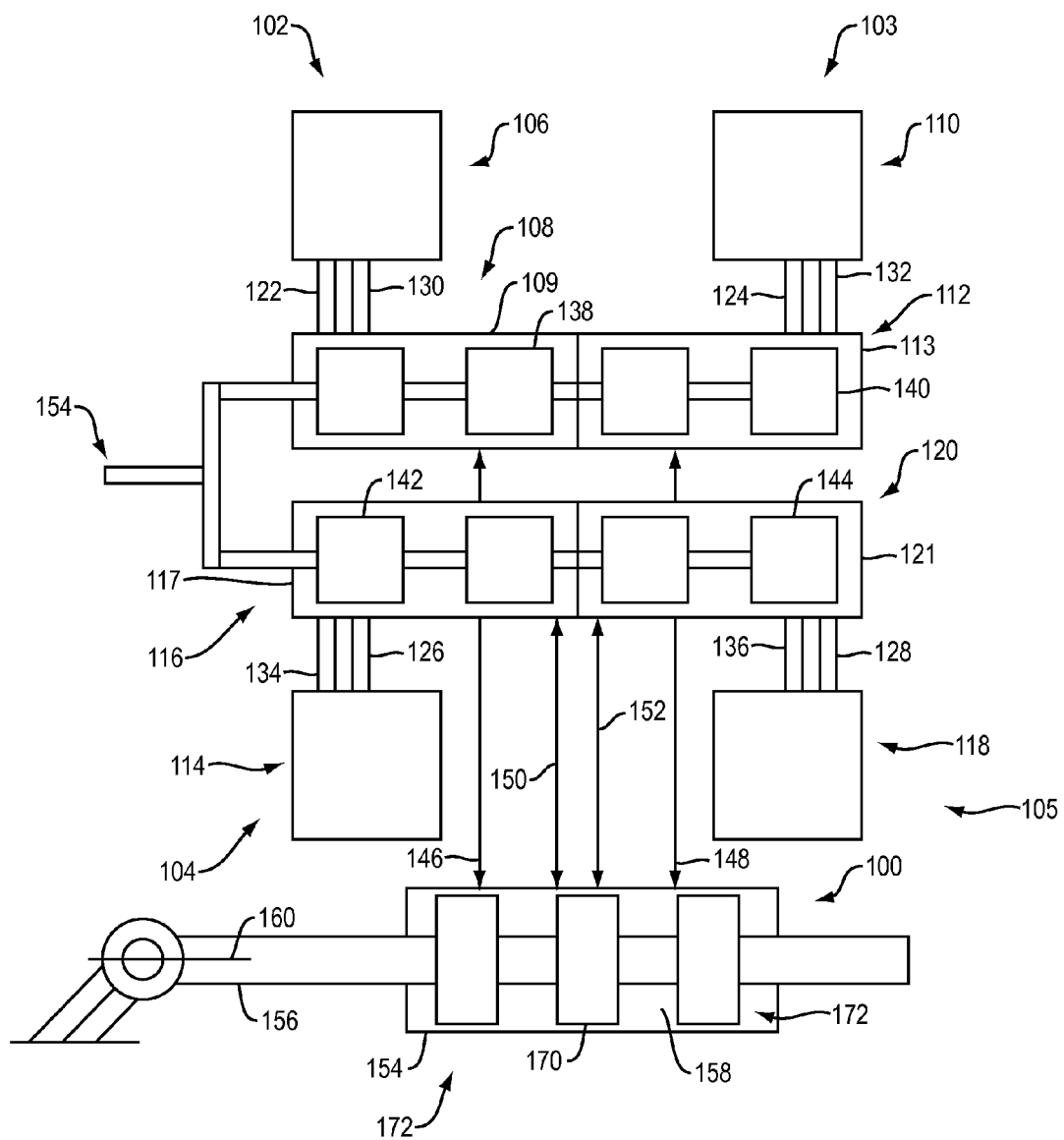
FIG. 3 is a schematic representation of a floating piston actuator disposed in fluid communication with a plurality of hydraulic actuator systems, according to one embodiment.

FIG. 3 is a schematic representation of a hydraulic or floating piston actuator 100 disposed in fluid communication with a plurality of hydraulic actuator systems. For example, in the arrangement illustrated, the floating piston actuator 100 is disposed in fluid communication with four hydraulic actuator systems: a first hydraulic actuator system 102, a second hydraulic actuator system 103, a third hydraulic actuator system 104, and a fourth hydraulic actuator system 105. In one arrangement, the first hydraulic actuator system 102 includes a first pressurized fluid source 106 disposed in fluid communication with a first servovalve assembly 108 and the second hydraulic actuator system 103 includes a second pressurized fluid source 110 disposed in fluid communication with a second servovalve assembly 112. Additionally, the third hydraulic actuator system 104 includes a third pressurized fluid source 114 disposed in fluid communication with a third servovalve assembly 116 and the fourth hydraulic actuator system 105 include a fourth pressurized fluid source 118 disposed in fluid communication with a fourth servovalve assembly 120.

While the pressurized fluid sources 106, 110, 114, 118 can be configured in a variety of ways, in one arrangement, the pressurized fluid sources 106, 110, 114, 118 each include a fluid reservoir and a fluid pump configured to deliver fluid from the reservoir to the corresponding servovalve assembly 108, 112, 116, 120 via respective transmission lines 122, 124, 126, 128. The fluid pump of each pressurized fluid source 106, 110, 114, 118 is also configured to provide fluid from the servovalve assemblies 108, 112, 116, 120 to the corresponding reservoirs via return lines or conduits 130, 132, 134, 136.

The servovalve assemblies 108, 112, 116, 120 are configured to provide redundant control of the hydraulic actuator 100 during operation. Each of the servovalve assemblies 108, 112, 116, 120 each include a corresponding housing 109, 113, 117, and 121 that contains a corresponding sleeve and a valve member 138, 140, 142, 144, such as a spool, disposed within the sleeve. Each sleeve defines a set of ports for fluid coupling of each servovalve assembly 108, 112, 116, 120 to a corresponding pressurized fluid source 106, 110, 114, 118 via both the transmission lines 122, 124, 126, 128 and the return lines 130, 132, 134, 136. Additionally, each sleeve defines a set of ports for fluid coupling of each servovalve assembly 108, 112, 116, 120 to the floating piston actuator 100. For example, the first sleeve defines a set of ports for coupling a fluid exchange line 146 to the floating piston actuator 100, the second sleeve defines a set of ports for coupling a fluid exchange line 148 to the floating piston actuator 100, the third sleeve defines a set of ports for coupling a fluid exchange line 150 to the floating piston actuator 100, and the fourth sleeve defines a set of ports for coupling a fluid exchange line 152 to the floating piston actuator 100.

Each valve member 138, 140, 142, 144 is configured to meter an amount of fluid flowing through the corresponding servovalve assembly 108, 112, 116, 120 from the pressurized fluid sources 106, 110, 114, 118 to the floating piston actuator 100. For example, the first and second valve members 138, 140 and the third and fourth valve members 142, 144 are secured at one end to an actuator 154. Movement of the actuator 154 by an operator causes the valve members 138, 140, 142, 144 to translate longitudinally within their respective housings 109, 113, 117, 121 in order to control porting of the fluid between the transmission lines 122, 124, 126, 128 and return lines 130, 132, 134, 136 to the floating piston actuator 100.

The floating piston actuator 100 is configured to operate a variable-geometry element, such as a rotor associated with a helicopter or a flight control surface associated with an aircraft. The floating piston actuator 100 includes a housing 154 secured to a variable-geometry element, such as a rotor, and an elongate shaft 156 extending through a chamber 158 defined by the housing 154. In one arrangement, an end of the elongate shaft 156 is secured to a mounting surface and the housing 154 of the floating piston actuator 100 is configured to translate relative to a longitudinal axis 160 of the elongate shaft 156 in response to actuation of the valve member 122. In another arrangement, as indicated with respect to FIGS. 4-9, the housing 154 is secured to a mounting surface and the elongate shaft 156 is configured to translate along the longitudinal axis 160 in response to actuation of the valve member 122 to drive a load.

Figure 4:
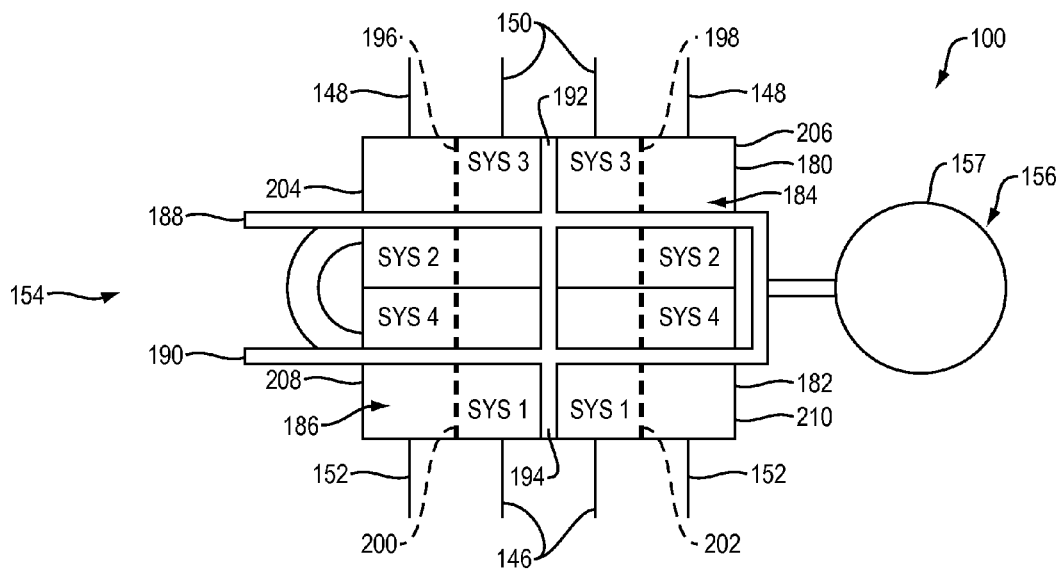
FIG. 4 illustrates an arrangement of a quad floating piston actuator with the associated actuator housings configured in parallel, according to one embodiment.
Figure 5:
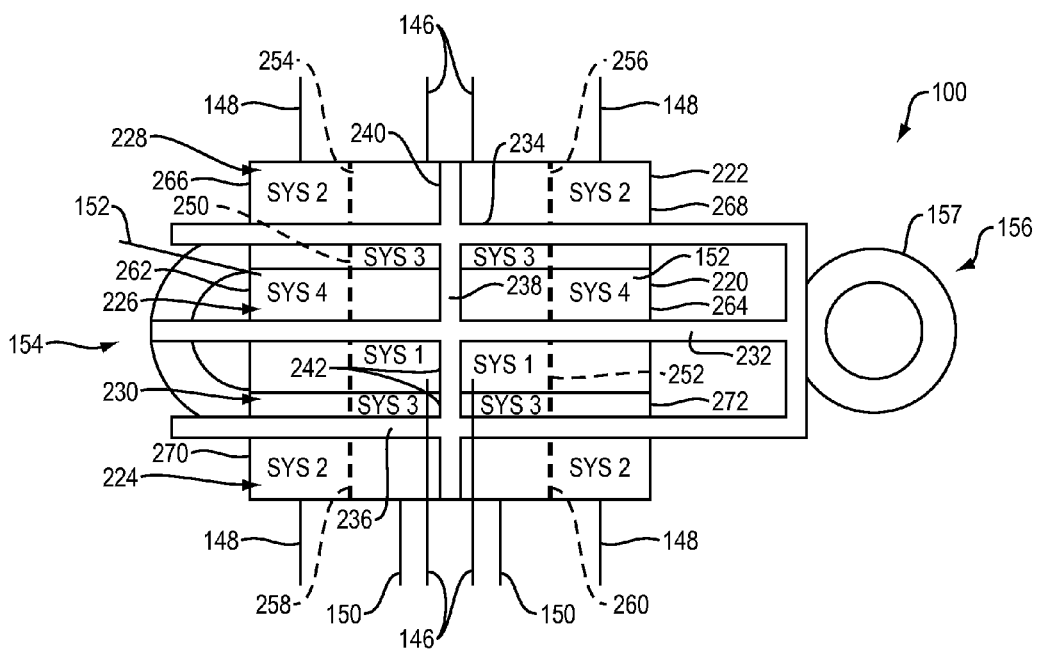
FIG. 5 illustrates an alternate arrangement of a quad floating piston actuator with the associated actuator housings configured in parallel, according to one embodiment.
Figure 6:
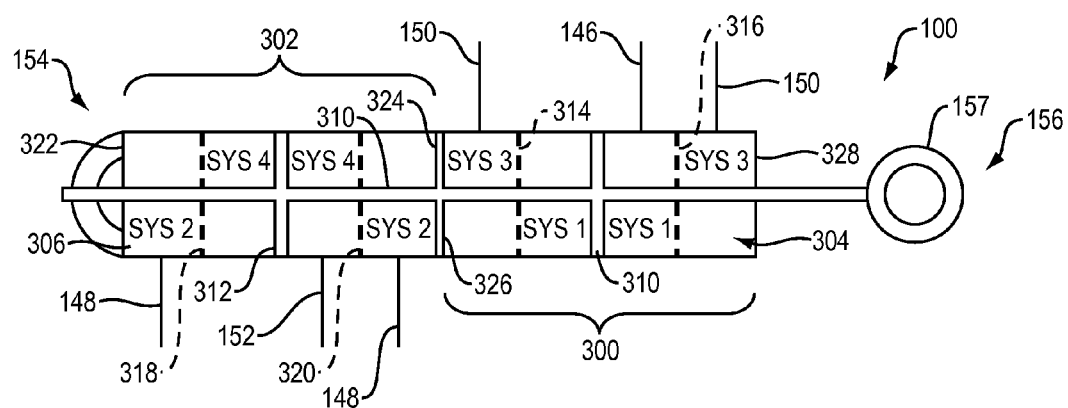
FIG. 6 illustrates an arrangement of a quad floating piston actuator with the associated actuator housings configured in series, according to one embodiment.

The floating piston actuator 100 includes pistons that divide the chamber 158 into separate sections or actuator volumes. For example, as illustrated, the floating piston actuator 100 includes a set of secured pistons 170 coupled to the elongate shaft 156 and a set of moveable pistons 172 moveably disposed on the elongate shaft 156. Depending upon the configuration of the set of secured pistons 170 and the set of moveable pistons 172, the floating piston actuator 100 can define a variety of actuator volumes that are disposed in fluid communication with the four hydraulic actuator systems 102, 103, 104, 105. FIGS. 4-6 illustrate examples of these configurations.

FIG. 4 illustrates an arrangement of a floating piston actuator 100 configured to be used with the hydraulic actuator systems 102, 103, 104, 105. As illustrated, the housing 154 includes a first housing portion 180 defining a first housing chamber 184 and a second housing portion 182 defining a second housing chamber 186. The first housing portion 180 is disposed substantially parallel to the second housing portion 182. The elongate shaft 156 includes a first elongate shaft portion 188 disposed within the first housing chamber 184 and a second elongate shaft portion 190 disposed within the second housing chamber 186. As shown, the first elongate shaft portion 188 is disposed substantially parallel to the second elongate shaft portion 190 and both the first and second elongate shaft portions terminate in a common actuator end 157.

As shown, the set of secured pistons 170 includes a first secured piston 192 coupled to the first elongate shaft portion 188 and a second secured piston 194 coupled to the second elongate shaft portion 190. Furthermore, the set of moveable pistons 172 includes first and second moveable pistons 196, 198 moveably disposed on the first elongate shaft portion 188 and third and fourth moveable pistons 200, 202 moveably disposed on the second elongate shaft portion 190. As illustrated, the first moveable piston 196 is positioned between the first secured piston 192 and a first end wall 204 of the first housing portion 180 and the second moveable piston is located between the first secured piston 192 and a second end wall 206 of the first housing portion 180. Additionally, the third moveable piston 200 is located between the second secured piston 192 and a first end wall 208 of the second housing portion 182 and the fourth moveable piston 202 is located between the second secured piston 192 and a second end wall 210 of the second housing portion 182.

Based upon such positioning, a volume between the first secured piston 192 and the first moveable piston 196 and a volume between the first secured piston 192 and the second moveable piston 198 define a first set of actuator volumes disposed in fluid communication with the first hydraulic actuator system 102 and a volume between the first moveable piston 196 and the first end wall 204 and a volume between the second moveable piston 198 and the second end wall 206 define a second set of actuator volumes disposed in fluid communication with the second hydraulic actuator system 103. Furthermore, a volume between the second secured piston 194 and the third moveable piston 200 and a volume between the second secured piston 194 and the fourth moveable piston 202 define a third set of actuator volumes disposed in fluid communication with the third hydraulic actuator system 104 and a volume between the third moveable piston 200 and the first end wall 208 and a volume between the fourth moveable piston 202 and the second end wall 210 define the fourth set of actuator volumes disposed in fluid communication with the fourth hydraulic actuator system 105.

With such a configuration, when all four hydraulic actuator systems 102, 103, 104, 105 are functional, the floating piston actuator 100 operates in a force-balanced manner to minimize binding stresses within the actuator 100. Additionally, in the event that either the second or the third hydraulic actuator systems 103, 104 and either of the first or the second hydraulic actuator systems 102, 105 were to become inactive, the floating piston actuator 100 can continue to operate in a forced balanced manner while providing hydraulic redundancy and minimizing overall weight.

FIG. 5 illustrates an arrangement of a floating piston actuator 100 configured to be used with the hydraulic actuator systems 102, 103, 104, 105. As illustrated, the housing 154 includes a first housing portion 220 defining a first housing chamber 226, a second housing portion 222 defining a second housing chamber 228, and a third housing portion 224 defining a third housing chamber 230. The first, second and third housing portions 226, 228, 230 are disposed parallel to each other. As indicated in FIG. 5, the volume defined by the second housing chamber 228 is about one-half of the volume defined by the first housing chamber 226 and the volume defined by the third housing chamber 230 is about one-half the volume defined by the first housing chamber 226. The elongate shaft 156 includes a first elongate shaft portion 232 disposed within the first housing chamber 226, a second elongate shaft portion 234 disposed within the second housing chamber 228, and a third elongate shaft portion 236 disposed within the third housing chamber 230. As shown, the first, second and third elongate shaft portions 232, 234, 236 are disposed substantially parallel to each other and terminate in a common actuator end 157.

The set of secured pistons 170 includes a first secured piston 238 coupled to the first elongate shaft portion 232, a second secured piston 240 coupled to the second elongate shaft portion 234, and a third secured piston 242 coupled to the third elongate shaft portion 236. The set of moveable pistons 172 includes a first moveable piston 250 located between the first secured piston 238 and a first end wall 262, a second moveable piston 252 located between the first secured piston 238 and a second end wall 264, a third moveable piston 254 disposed between the second secured piston 240 and a first end wall 266, a fourth moveable piston 256 disposed between the second secured piston 240 and a second end wall 268, a fifth moveable piston 258 disposed between the third secured piston 242 and a first end wall 270, and a sixth moveable piston 260 located between the third secured piston 242 and a second end wall 272.

Based upon such positioning, a volume between the first secured piston 238 and the first moveable piston 250 and a volume between the first secured piston 238 and the second moveable piston 252 define a first set of actuator volumes disposed in fluid communication with the first hydraulic actuator system 102. A volume between the third moveable piston 254 and the first end wall 266, a volume between the fourth moveable piston 256 and the second end wall 268, a volume between the fifth moveable piston 258 and the first end wall 270 and a volume between the sixth moveable piston 260 and the second end wall 272 define a second set of actuator volumes disposed in fluid communication with the second hydraulic actuator system 103. A volume between the third moveable piston 254 and the second secured piston 240, a volume between the fourth moveable piston 256 and the second secured piston 240, a volume between the fifth moveable piston 258 and the third secured piston 242, and a volume between the sixth moveable piston 260 and the third secured piston 242 define a third set of actuator volumes disposed in fluid communication with the third hydraulic actuator system 104. Also, a volume between the first moveable piston 250 and the first end wall 262 of the and a volume between the second moveable piston 252 and the second end wall 264 define a fourth set of actuator volumes disposed in fluid communication with the fourth hydraulic actuator system 104.

With such a configuration, when all four hydraulic actuator systems 102, 103, 104, 105 are functional, the floating piston actuator 100 operates in a force-balanced manner to minimize binding stresses within the actuator 100. Additionally, in the event that either the second or the third hydraulic actuator systems 103, 104 and either of the first or the second hydraulic actuator systems 102, 105 were to become inactive, the floating piston actuator 100 can continue to operate in a forced balanced manner while providing hydraulic redundancy and minimizing overall weight.

FIGS. 4 and 5 illustrate various housing portions of the floating piston actuator 100 disposed in a substantially parallel relationship. FIG. 6 illustrates various housing portions of the floating piston actuator 100 disposed in a substantially collinear relationship. For example, the housing 154 includes a first housing portion 300 defining a first housing chamber 304 and a second housing portion 302 defining a second housing chamber 306. As illustrated, the first housing portion 300 is substantially collinear with the second housing portion 302 relative to a longitudinal axis of the housing 154. The elongate shaft 156 includes a first elongate shaft portion 308 disposed within the first housing chamber 304 and a second elongate shaft portion 310 disposed within the second housing chamber 306. The first elongate shaft portion 308 is substantially collinear with, and is coupled to, the second elongate shaft portion 310.

The set of secured pistons 170 includes a first secured piston 310 coupled to the first elongate shaft portion 308 and a second secured piston 312 coupled to the second elongate shaft portion 310. The set of moveable pistons 172 includes a first moveable piston 314 moveably disposed on the first elongate shaft portion 308 between the first secured piston 310 and a first end wall 326, a second moveable piston 316 moveably disposed on the first elongate shaft portion 308 between the first secured piston 310 and a second end wall 328, a third moveable piston 318 moveably disposed on the second elongate shaft portion 310 between the second secured piston 312 and a first end wall 322 and, a fourth moveable piston 320 moveably disposed on the second elongate shaft portion 310 between the second secured piston 312 and a second end wall 324.

Based upon such positioning, a volume between the first secured piston 310 and the first moveable piston 314 and a volume between the first secured piston 310 and the second moveable piston 316 defines a first set of actuator volumes disposed in fluid communication with the first hydraulic actuator system 102. A volume between the third moveable piston 318 and the first end wall 322 and a volume between the fourth moveable piston 320 and the second end wall 324 define a second set of actuator volumes disposed in fluid communication with the second hydraulic actuator system 103. Further, a volume between the first moveable piston 314 and the first end wall 326 and a volume between the second moveable piston 316 and the second end wall 328 define a third set of actuator volumes disposed in fluid communication with the third hydraulic actuator system 104, and a volume between the third moveable piston 318 and the second secured piston 312 and a volume between the fourth moveable piston 320 and the second secured piston 312 define a fourth set of actuator volumes disposed in fluid communication with the fourth hydraulic actuator system 105.

With all of the actuator volumes disposed in a substantially collinear manner, and with any combination of operable and inoperable hydraulic actuator systems 102, 103, 104, 105, the floating piston actuator 100 operates in a force-balanced manner to minimize binding stresses within the actuator 100. Furthermore, based upon the configuration of the floating piston actuator 100, the floating piston actuator 100 encounters less output force reduction, compared to conventional actuators, when the hydraulic actuator systems encounter a failure. For example, for certain hydraulic actuator system failures, the above described floating piston actuator 100 can lose up to half of its output power. By comparison, conventional actuators can lose as much as 66% of the output power with similar hydraulic actuator system failure.

For example, with reference to FIG. 6, in the case where any single hydraulic actuator systems 102, 103, 104, 105 were to become inoperative, or a combination of the first and second actuator systems 102, 103; the first and fourth actuator systems 102, 105; or the second and third actuator systems 103, 104 were to become inoperative, the floating piston actuator 100 can maintain a full output force. However, in the event that the second and fourth actuator systems 103, 105 were to become inoperative, the first and third actuator systems 102, 104 can drive a load coupled to the elongate shaft 156, but only at half the output load. Similarly in the event that the first and third actuator systems 102, 104 were to become inoperative, the second and fourth actuator systems 103, 105 can drive a load coupled to the elongate shaft 156, but, again, only at half the output load.

As indicated, above, the floating piston actuator 100 in FIGS. 4, 5, and 6 are configured to be used with four separate hydraulic actuator systems 102, 103, 104, 105. In one arrangement, as illustrated in FIGS. 7-9, the floating piston actuator 100 can be configured to be used with only three hydraulic actuator systems 102, 103, 104 while allowing the floating piston actuator 100 to operate in a forced balanced manner.

Figure 7:
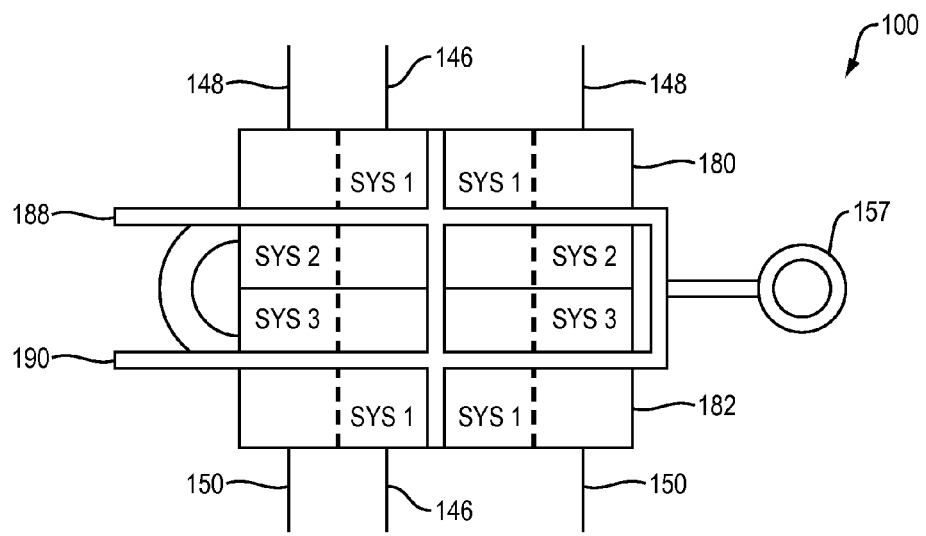
FIG. 7 illustrates an arrangement of a triple floating piston actuator with the associated actuator housings configured in parallel, according to one embodiment.

For example, the floating piston actuator 100 of FIG. 7 is configured such that the first hydraulic actuator system 102 provides fluid, via the fluid exchange line 146 to the first set of actuator volumes defined in both the first housing portion 180 and the second housing portion 182. Additionally, the second fluid actuator system 103 provides fluid to the second set of actuator volumes defined in the first housing portion 180 via fluid exchange line 148 and the third fluid actuator system 104 provides fluid to the third set of actuator volumes defined in the second housing portion 182 via fluid exchange line 150. With such a configuration, in the event that the second and third fluid actuator systems 103, 104 were to become inoperative, the first fluid actuator system 102 provides pressurized fluid to the first and second housing portions 180, 182 to allow the floating piston actuator 100 to operate in a load balanced manner (i.e., such that the first and second elongate shaft portions 188, 190 provide substantially equal forces to a load coupled to end 157). Also with such a configuration, in the event that the first fluid actuator system 102 were to become inoperative, the second and third fluid actuator systems 103, 104 provide pressurized fluid to the to the first and second housing portions 180, 182 to allow the floating piston actuator 100 to operate in a load balanced manner.

Figure 8:
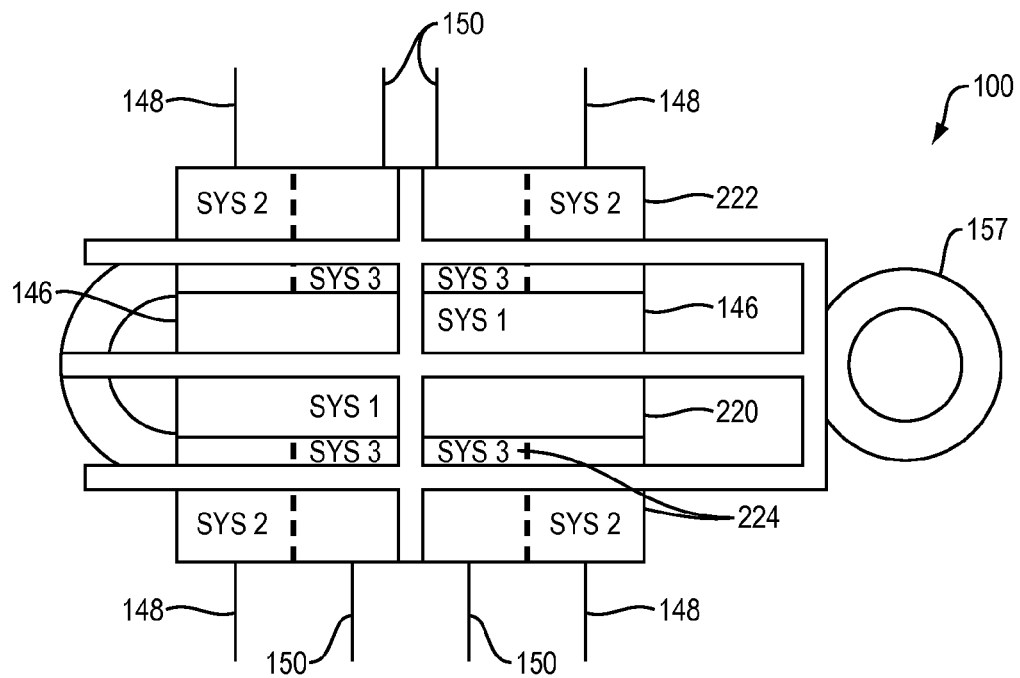
FIG. 8 illustrates an alternate arrangement of a triple floating piston actuator with the associated actuator housings configured in parallel, according to one embodiment.

In FIG. 8, the floating piston actuator 100 is configured such that the first hydraulic actuator system 102 provides fluid, via the fluid exchange lines 146 to the first set of actuator volumes defined in the first housing portion 220. Additionally, the second fluid actuator system 103 provides fluid to the second set of actuator volumes defined in the second and third housing portions 222, 224 via fluid exchange lines 148 and the third fluid actuator system 104 provides fluid to the third set of actuator volumes defined in the second and third housing portions 222, 224 via fluid exchange lines 150. With such a configuration, in the event that the second and third fluid actuator systems 103, 104 were to become inoperative, the first fluid actuator system 102 provides pressurized fluid to the first housing portion 220 to allow the floating piston actuator 100 to operate in a load balanced manner. Also with such a configuration, in the event that the first and second fluid actuator systems 102, 103 were to become inoperative, the third fluid actuator system 104 provides pressurized fluid to the third housing portion 224 to allow the floating piston actuator 100 to operate in a load balanced manner. Additionally with such a configuration, in the event that the first and third fluid actuator systems 102, 104 were to become inoperative, the second fluid actuator system 103 provides pressurized fluid to the second housing portion 222 to allow the floating piston actuator 100 to operate in a load balanced manner. Also with such a configuration, in the event that the first fluid actuator system 102 were to become inoperative, the second and third fluid actuator systems 103, 104 provide pressurized fluid to the to the second and third housing portions 222, 224 to allow the floating piston actuator 100 to operate in a load balanced manner. It should be noted that with the loss of only the first fluid actuator system 102 or only the second fluid actuator system 103, the floating piston actuator 100 maintains its actuator force output.

Figure 9:
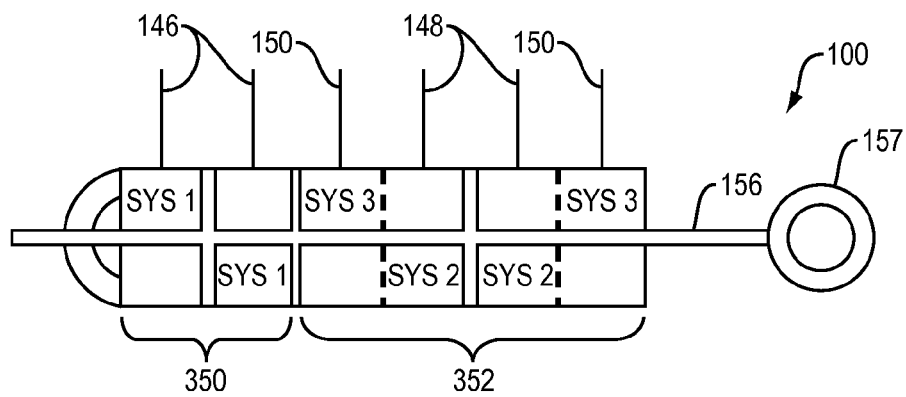
FIG. 9 illustrates an arrangement of a triple floating piston actuator with the associated actuator housings configured in series, according to one embodiment.

In FIG. 9, the floating piston actuator 100 is configured such that the first hydraulic actuator system 102 provides fluid, via the fluid exchange lines 146 to the first set of actuator volumes defined in a first housing portion 350. Additionally, the second fluid actuator system 103 provides fluid to the second set of actuator volumes defined in a second housing portion 352 via fluid exchange lines 148 and the third fluid actuator system 104 provides fluid to the third set of actuator volumes defined in the second housing portion 352 via fluid exchange lines 150. With such a configuration, in the event that either of the second or third fluid actuator systems 103, 104 were to become inoperative, the first fluid actuator system 102 provides pressurized fluid to the first housing portion 350 and the remaining of the second and third fluid actuator systems 103, 104 provides pressurized fluid to the second housing portion 352 to allow the floating piston actuator 100 to maintain a full output force on a load secured to the common actuator end 157. In the event that either the first fluid actuator system 102 or both the second and third fluid actuator systems 103, 104 were to become inoperative only one of the housing portions 350, 352 would receive pressurized fluid. Accordingly, in such a situation, while the floating piston actuator can drive a load coupled to the common actuator end 157, the floating piston actuator 100 can only generate one-half of its maximum output force on the load.

Accordingly, with the configurations of the floating piston actuator 100, multiple redundant hydraulic system operation can be arranged in a smaller, lighter, and less costly package than conventional actuators. Additionally, the floating piston actuator 100 can be configured for use with multiple redundant hydraulic systems to minimize or eliminate the presence of bending stresses in the elongate shaft, thereby minimizing or preventing fatigue failures and allowing for lighter designs.

As indicated with respect to FIG. 3, the valve members 138, 140, 142, 144 are coupled to an actuator 154. Movement of the actuator 154 by an operator via a mechanical linkage causes the valve members 138, 140, 142, 144 to translate longitudinally within their respective housings 109, 113, 117, 121 in order to control porting of the fluid between the transmission lines 122, 124, 126, 128 and return lines 130, 132, 134, 136 to the floating piston actuator 100.

Figure 10:
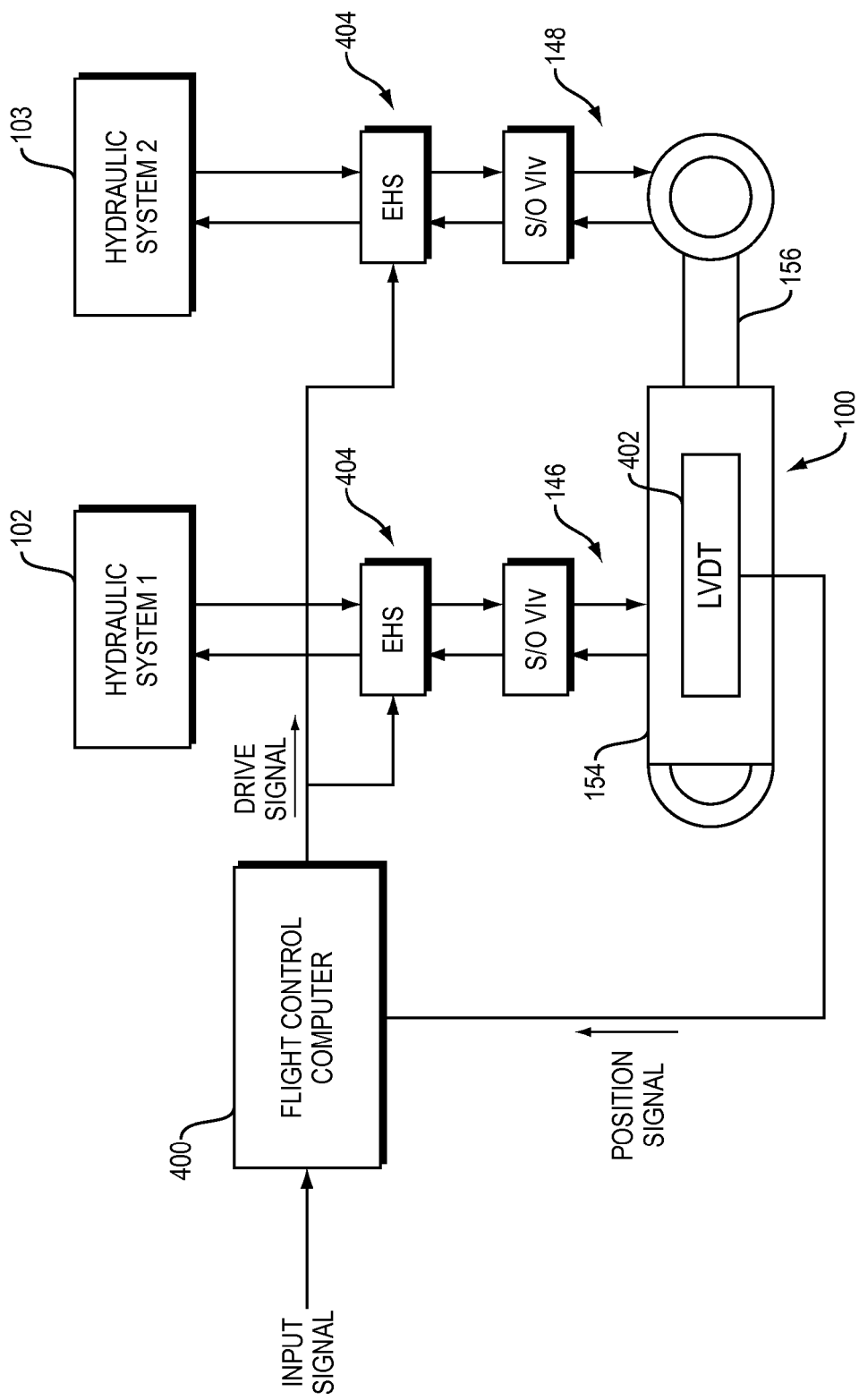
FIG. 10 illustrates a schematic representation of a floating piston actuator disposed in fluid communication with a set of electrohydraulic servovalves, according to one embodiment.
Figure 11:
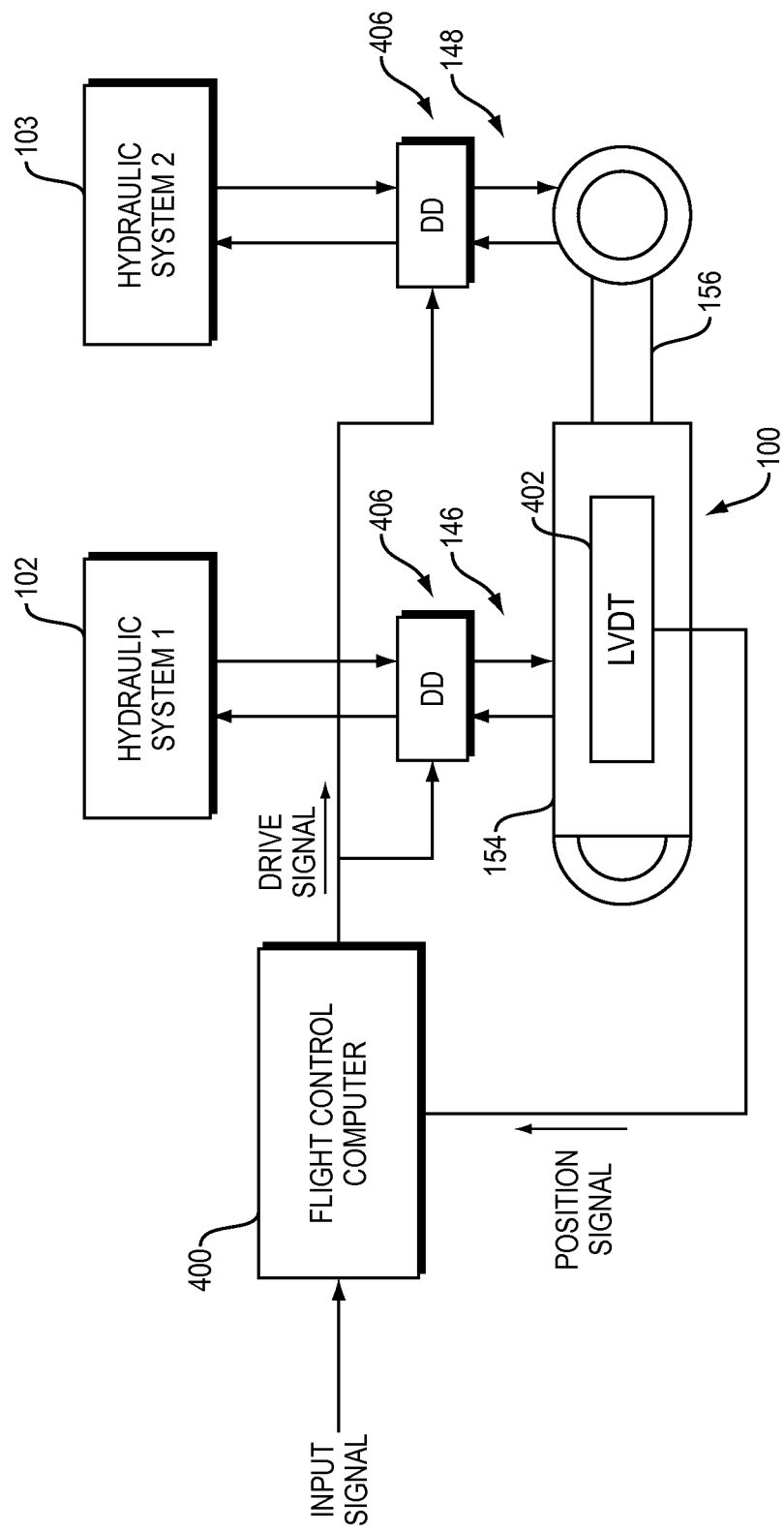
FIG. 11 illustrates schematic representation of a floating piston actuator disposed in fluid communication with a set of direct drive servovalves, according to one embodiment.

By contrast, in fly-by-wire systems, such as illustrated in FIGS. 10 and 11, a controller 400 such as a flight control computer (FCC) receives electrical input signals provided by an operator via a joystick. Based upon the input signal, the controller 400 sends a drive signal to either one or more electrohydraulic servovalves 404 as shown in FIG. 10 or one or more direct drive servovalves 406 as shown in FIG. 11. Based upon the drive signals, the electrohydraulic servovalves 404 or the direct drive servovalves 406 adjust the position of one or more spools associated with corresponding servovalve assemblies (not shown). Such positioning controls the flow of pressurized fluid from the fluid actuator systems 102, 103, 104, 105 to the floating piston actuator 100 to adjust the relative positioning of the elongate shaft 156 and the housing 154.

In one arrangement, to provide feedback control to the controller 400, the floating piston actuator 100 includes one or more position sensors 402, such as one or more linear variable differential transformers (LVDTs) coupled to the elongate shaft 156. In use, as the relative positioning of the elongate shaft 156 and the housing 154 change over time, the position sensor sends a position signal to the controller to indicate the relative positioning of the housing 154 and the elongate shaft 156. Based upon the position signal received, the controller 400 can continue to provide the drive signal to the servovalves 404, 406 until the relative positioning between the housing 154 and the elongate shaft 156 reaches a position that corresponds to a position indicated by the input signal.

The electrohydraulic servovalves 404 can be configured in a variety of ways. For example, each of the electrohydraulic servovalves 404 can be configured as a dual servovalve having dual spools, individual servovalves having individual spools, or any combination thereof. The direct drive valves 406 can also be configured in a variety of ways. For example, each of the direct drive valves 406 can be configured as one direct drive valve 406 controlling two spools, two direct drive valves 406 controlling individual spools, multiple direct drive valves 406 for mechanical redundancy, or any combination thereof.

As indicated above, the fluid actuator systems 102, 103, 104, 105 provide fluid to the floating piston actuator 100 via exchange lines 146, 148, 150, 152 during operation. With the actuator 100 configured in a floating piston arrangement, the floating piston actuator requires certain exchange lines to port pressurized fluid into the actuator housing 154 via one or more channels extending along the length of the elongate shaft 156. Description of the configuration of the elongate shaft channels is provided in U.S. patent application Ser. No. 12/045,924 filed on Mar. 11, 2008, entitled, "HYDRAULIC ACTUATOR WITH FLOATING PISTONS", the contents and teachings of which are hereby incorporated by reference in their entirety. However, with such porting and in use, the elongate shaft 156 and the housing 154 are configured to translate relative to each other, depending on whether the housing 154 is secured to a mounting surface and the elongate shaft 156 is configured to translate along the longitudinal axis 160 or if the elongate shaft 156 is secured to a mounting surface and the housing 154 of the floating piston actuator 100 is configured to translate relative to a longitudinal axis 160 of the elongate shaft 156. In either configuration, movement of a portion of the floating piston actuator 100 relative to the fluid actuator systems 102, 103, 104, 105 can place a strain on the fluid exchange lines 146, 148, 150, 152 during operation. To minimize such strains, the floating piston actuator 100 can be configured with a variety of fluid transmission/connection members.

Figure 12:
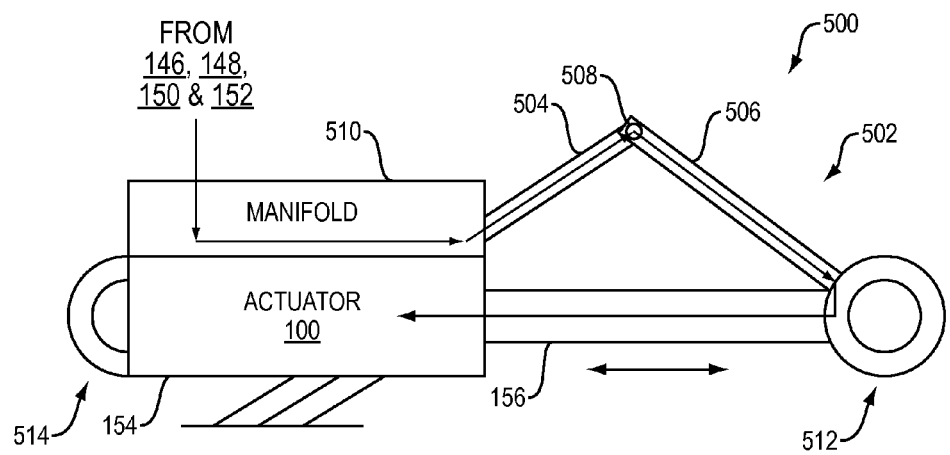
FIG. 12 illustrates an arrangement of a fluid transmission/connection member of the floating piston actuator.
Figure 13:
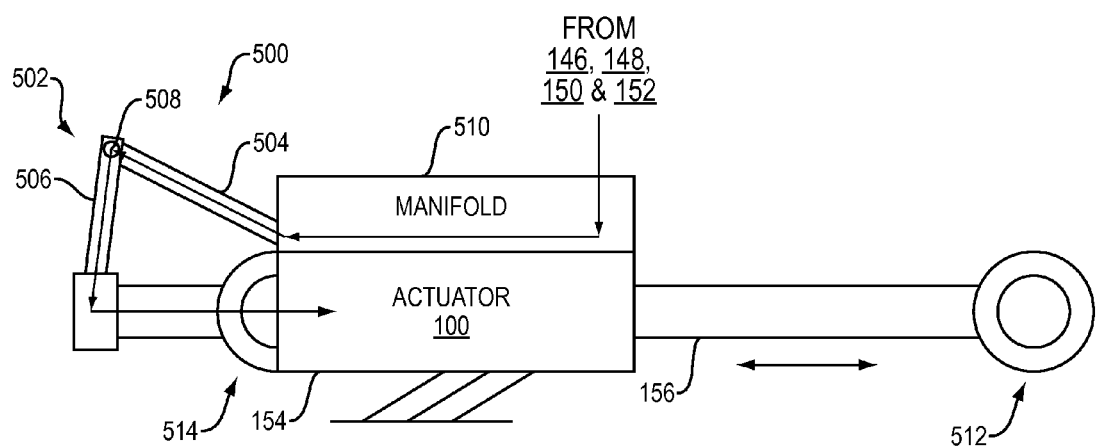
FIG. 13 illustrates an arrangement of a fluid transmission/connection member of the floating piston actuator.

FIGS. 12 and 13 illustrate one arrangement of a fluid transmission/connection member 500 configured as a linkage assembly 502. The linkage assembly 502 includes a first channel member 504, a second channel member 506, and a hydraulic swivel 508 disposed between the first and second channel members 504, 506. The first channel member 504 is disposed in fluid communication with a manifold 510 which is configured to receive pressurized fluid from any of fluid exchange lines 146, 148, 150, 152. The second channel member 506 is coupled to, and disposed in fluid communication with, the channels defined by the elongate shaft 156. For example, the second channel member 506 can be mechanically and fluidically coupled to the elongate shaft 156 at either a first end 512 or a second end 514 of the elongate shaft, as illustrated in FIGS. 12 and 13 respectively.

In use, as the manifold 510 directs pressurized fluid between the fluid exchange lines 146, 148, 150, 152 and the actuator 100, the manifold 510 directs the fluid to the linkage assembly 502. The first channel member 506 and the second channel member 508 carry the fluid through the hydraulic swivel 508 between the manifold 510 and the actuator 100. As the pressurized fluid adjusts the positioning of the pistons 170, 172 within the housing 154, the elongate shaft 156 translates relative to the housing 154. Such translation causes the first and second channel members 504, 506 to rotate relative to each other, via the hydraulic swivel 508 while maintaining fluid communication between the manifold 510 and the actuator 100.

Figure 14A:
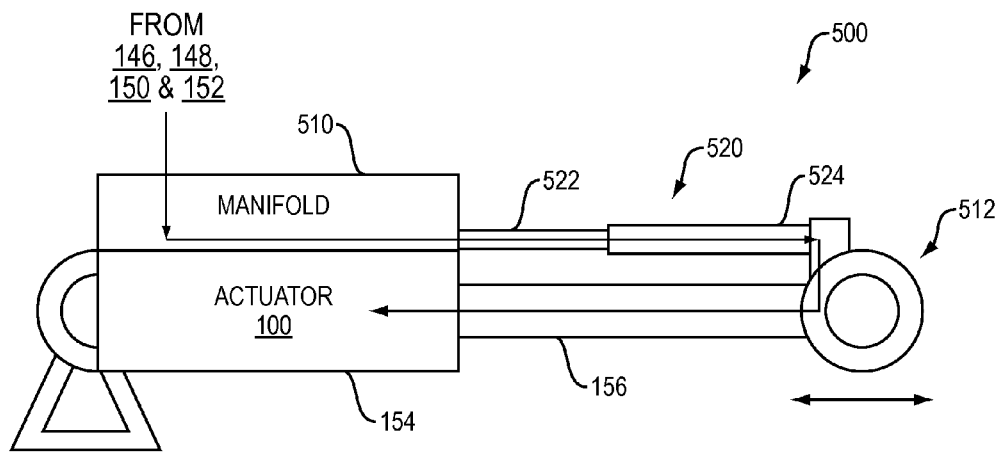
FIG. 14A illustrates an arrangement of a fluid transmission/connection member of the floating piston actuator.
Figure 14B:
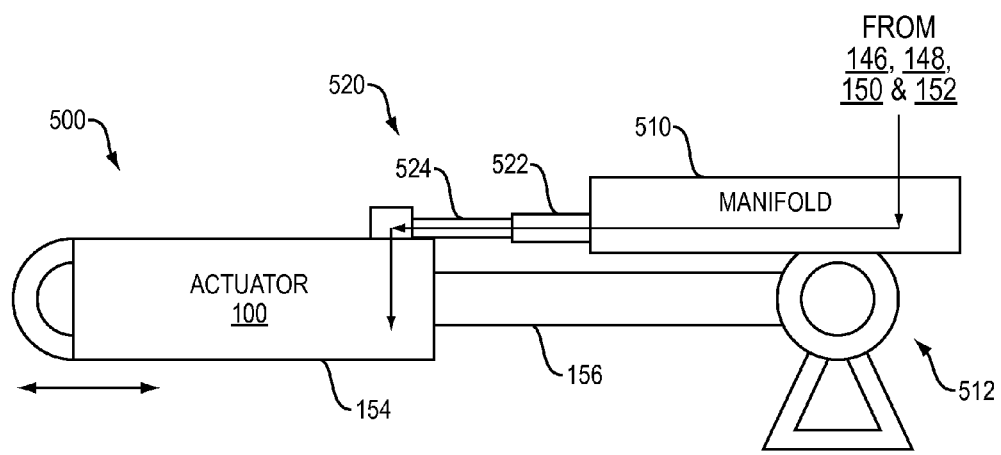
FIG. 14B illustrates an arrangement of a fluid transmission/connection member of the floating piston actuator.

FIGS. 14A and 14B illustrate another arrangement of a fluid transmission/connection member 500 where the fluid transmission/connection member 500 is configured as a sliding assembly 520. The sliding assembly 520 includes a first channel member 522 and a second channel member 524 slidably coupled to each other. For example, as illustrated in FIG. 14A, the first channel member 522 is mechanically and fluidically coupled to a manifold 510 and is disposed within the second channel member 524. As shown, the second channel member 524 is mechanically and fluidically coupled to the end 512 of the elongate shaft 156. As illustrated in FIG. 14B, the second channel member 524 is mechanically and fluidically coupled to the housing 154 and is disposed within the first channel member 522. As shown, the first channel member 522 is mechanically and fluidically coupled to the end 512 of the elongate shaft 156 via manifold 510.

During operation, the configuration of the sliding assembly 520 allows the housing 154 and elongate shaft 156 to move relative to each other while minimizing strain on the fluid exchange lines 146, 148, 150, 152. For example, as the manifold 510 directs pressurized fluid between the fluid exchange lines 146, 148, 150, 152 and the actuator 100, the manifold 510 directs the fluid to the sliding assembly 520. The first channel member 524 and the second channel member 522 carry the fluid through the sliding assembly 520 between the manifold 510 and the actuator 100. With reference to FIG. 14A, as the pressurized fluid adjusts the positioning of the pistons 170, 172 within the housing 154, the elongate shaft 156 translates relative to the housing 154. Such translation causes the second channel member 524 to translate relative to the first channel member while maintaining fluid communication between the manifold 510 and the actuator 100. With reference to FIG. 14B, as the pressurized fluid adjusts the positioning of the pistons 170, 172 within the housing 154, the housing 154 translates relative to the elongate shaft 156. Such translation causes the second channel member 524 to translate relative to the first channel member 522 while maintaining fluid communication between the manifold 510 and the actuator 100.

Figure 15:
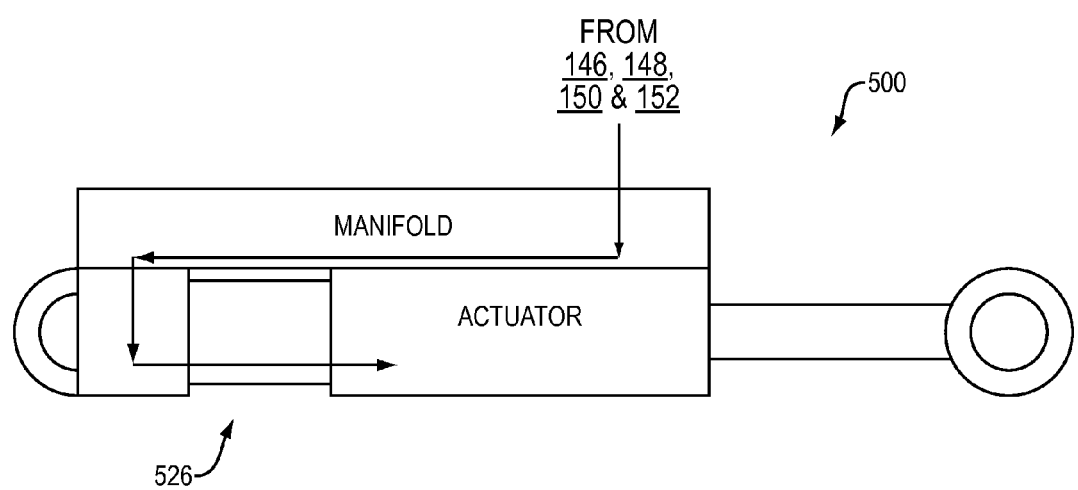
FIG. 15 illustrates an arrangement of a fluid transmission/connection member of the floating piston actuator.

It should be noted that the sliding assembly 520 can alternately be configured in a variety of ways. For example, the sliding assembly 520 can include a balance tube 526 as illustrated in FIG. 15 with the fluid connection being made without any external sliding members. This applies to the next three arrangements, shown in FIGS. 16-18, where the secondary hydraulic system is required for unidirectional movements.

As indicated above, the floating piston actuator 100 is configured to operate with a plurality of hydraulic actuator systems 102, 103, 104, 105 to provide redundancy to the systems. In one arrangement, the plurality of hydraulic actuator systems 102, 103, 104, 105 include, in addition to the floating piston actuator 100 a reserve or backup actuator 600 that is not used in normal operation and that provides unidirectional motion to a load, when required (e.g., in an emergency).

Figure 16:
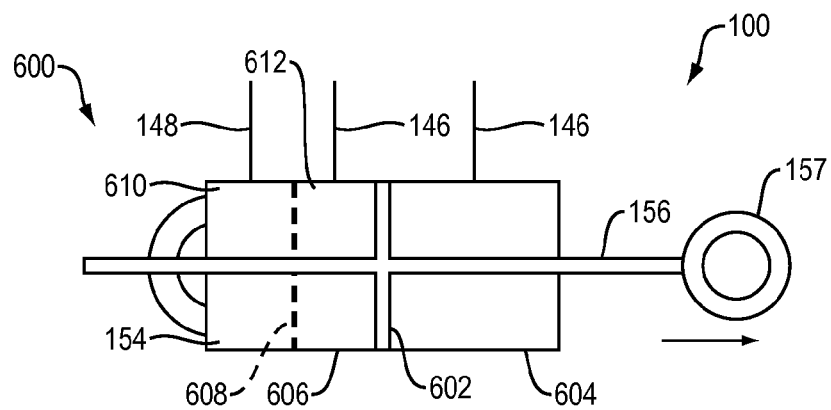
FIG. 16 illustrates the floating piston actuator configured as a reserve actuator, according to one arrangement.
Figure 17:
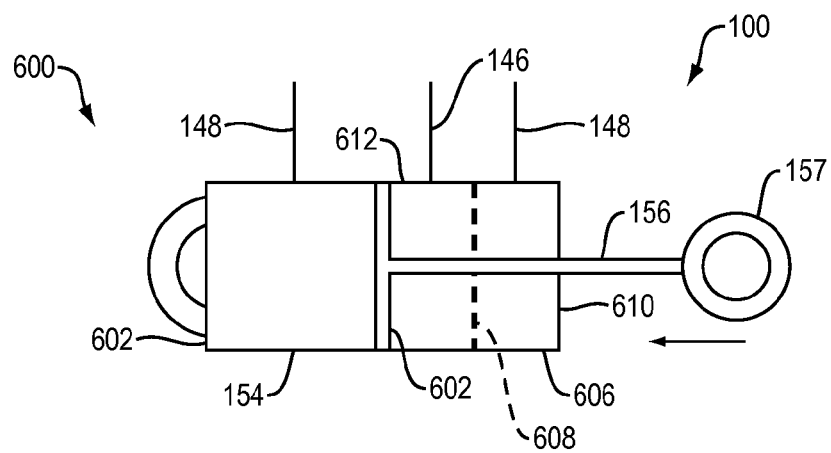
FIG. 17 illustrates the floating piston actuator configured as a reserve actuator, according to one arrangement.
Figure 18:
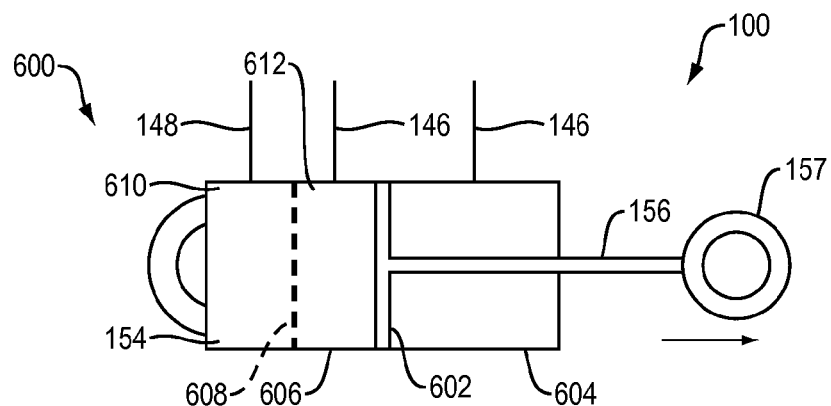
FIG. 18 illustrates the floating piston actuator configured as a reserve actuator, according to one arrangement.

For example, with reference to FIGS. 16-18, the reserve actuator 600 includes a secured piston 602 that divides the housing 154 into a first chamber 604 and a second chamber 606. The secured piston 602 is coupled to the elongate shaft 156 having an end 157 coupled to a load, such as a wing flap. The reserve actuator 600 further includes a floating piston 608 disposed within the second chamber 606 that divides the second chamber into a first subchamber 610 and a second subchamber 612. The first chamber 604 and the second subchamber 612 are disposed in fluid communication with the hydraulic actuator system 102 and the first subchamber 610 is disposed in fluid communication with the hydraulic actuator system 103.

During operation, in the event that the first hydraulic actuator system 102 were to become inoperative, the second hydraulic actuator system 103 provides pressurized fluid to the first subchamber 610 to drive the elongate shaft 156 into either a fully extended (FIGS. 16, 18) or a fully retracted (FIG. 17) position to move the load coupled to the elongate shaft 156. In all cases illustrated in FIGS. 16-18, the same cylinder can be used with two independent hydraulic fluid sources allowing redundancy on a less reliable hydraulic actuator system (e.g., pump associated with system) without duplicating the output cylinder for a lighter and less costly actuator.

While various embodiments of the invention have been particularly shown and described, it will be understood by those skilled in the art that various changes in form and details may be made therein without departing from the spirit and scope of the invention as defined by the appended claims.

As recited above, the floating piston actuator 100 is disposed in fluid communication with four hydraulic actuator systems: a first hydraulic actuator system 102, a second hydraulic actuator system 103, a third hydraulic actuator system 104, and a fourth hydraulic actuator system 105. In one arrangement, the first hydraulic actuator system 102 includes a first pressurized fluid source 106 disposed in fluid communication with a first servovalve assembly 108 and the second hydraulic actuator system 103 includes a second pressurized fluid source 110 disposed in fluid communication with a second servovalve assembly 112. Additionally, the third hydraulic actuator system 104 includes a third pressurized fluid source 114 disposed in fluid communication with a third servovalve assembly 116 and the fourth hydraulic actuator system 105 include a fourth pressurized fluid source 118 disposed in fluid communication with a fourth servovalve assembly 120. Such description is by way of example only. While four hydraulic actuator systems are illustrated, the floating piston actuator 100 can be disposed in fluid communication with any number of hydraulic actuator systems.

What is claimed is:

1. A hydraulic actuator, comprising:
an elongate shaft;
a housing defining a housing chamber, at least a portion of the elongate shaft disposed within the housing chamber, the housing configured to translate relative to the elongate shaft to control positioning of a variable-geometry element associated with an aircraft;
at least one secured piston coupled to the elongate shaft and disposed within the housing chamber in sliding contact therewith; and
a set of moveable pistons moveably disposed within the housing chamber on the elongate shaft in sliding contact with the housing chamber, the set of moveable pistons including at least one pair of movable pistons with an associated secured piston arranged between the paired movable pistons, the housing, the at least one secured piston, and the set of moveable pistons defining a first set of actuator volumes configured to be disposed in fluid communication with a first pressurized fluid source, a second set of actuator volumes configured to be disposed in fluid communication with a second pressurized fluid source, and a third set of actuator volumes configured to be disposed in fluid communication with a third pressurized fluid source, each set of actuator volumes providing for reciprocating movement of the actuator in response to pressurization by the respective pressurized fluid source.

2. The hydraulic actuator of claim 1, wherein:
the housing comprises a first housing portion and a second housing portion, the first housing portion defining a first housing chamber and the second housing portion defining a second housing chamber, the first housing portion being substantially parallel to the second housing portion;
the elongate shaft comprises a first elongate shaft portion disposed within the first housing chamber and a second elongate shaft portion disposed within the second housing chamber, the first elongate shaft portion being substantially parallel to the second elongate shaft portion;
the at least one secured piston comprises a first secured piston coupled to the first elongate shaft portion and a second secured piston coupled to the second elongate shaft portion, the first secured piston in sliding contact with the first housing chamber and the second secured piston in sliding contact with the second housing chamber; and the set of moveable pistons comprises:
- a first moveable piston moveably disposed on the first elongate shaft portion between the first secured piston and a first end wall of the first housing portion,
- a second moveable piston moveably disposed on the first elongate shaft portion between the first secured piston and a second end wall of the first housing portion, the first and second moveable pistons in sliding contact with the first housing chamber and having the first secured piston arranged therebetween,
- a third moveable piston moveably disposed on the second elongate shaft portion between the second secured piston and a first end wall of the second housing portion,
- a fourth moveable piston moveably disposed on the second elongate shaft portion between the second secured piston and a second end wall of the second housing portion, the third and fourth moveable pistons in sliding contact with the second housing chamber and having the second secured piston arranged therebetween;
- a volume between the first secured piston and the first moveable piston, a volume between the first secured piston and the second moveable piston, a volume between the second secured piston and the third moveable piston, and a volume between the second secured piston and the fourth moveable piston defining the first set of actuator volumes,
- a volume between the first moveable piston and the first end wall of the first housing portion and a volume between the second moveable piston and the second end wall of the first housing portion defining the second set of actuator volumes, and
- a volume between the third moveable piston and the first end wall of the second housing portion and a volume between the fourth moveable piston and the second end wall of the second housing portion defining the third set of actuator volumes.

3. The hydraulic actuator of claim 1, wherein:
the housing comprises a first housing portion, a second housing portion, and a third housing portion, the first housing portion defining a first housing chamber, the second housing portion defining a second housing chamber, and the third housing portion defining a third housing chamber, the first housing portion, the second housing portion and the third housing portion being substantially parallel, the volume defined by the second housing chamber being about one-half of the volume defined by the first housing chamber, and the volume defined by the third housing chamber being about one-half the volume defined by the first housing chamber;
the elongate shaft comprises a first elongate shaft portion disposed within the first housing chamber, a second elongate shaft portion disposed within the second housing chamber, and a third elongate shaft portion disposed within the third housing chamber, the first elongate shaft portion, the second elongate shaft portion, and the third elongate shaft portion being substantially parallel;
the at least one secured piston comprises a first secured piston coupled to the first elongate shaft portion and in sliding contact with the first housing chamber, a second secured piston coupled to the second elongate shaft portion and in sliding contact with the second housing chamber, and a third secured piston coupled to the third elongate shaft portion and in sliding contact with the third housing chamber; and the set of moveable pistons comprises:
- a first moveable piston moveably disposed on the second elongate shaft portion between the second secured piston and a first end wall of the second housing portion,
- a second moveable piston moveably disposed on the second elongate shaft portion between the second secured piston and a second end wall of the second housing portion, the first and second moveable pistons in sliding contact with the second housing chamber and having the second secured piston arranged therebetween,
- a third moveable piston moveably disposed on the third elongate shaft portion between the third secured piston and a first end wall of the third housing portion, and
- a fourth moveable piston moveably disposed on the third elongate shaft portion between the third secured piston and a second end wall of the third housing portion,
- a volume between the first secured piston and a first end wall of the first housing portion and a volume between the first secured piston and a second end wall of the first housing portion defining the first set of actuator volumes, the third and fourth moveable pistons in sliding contact with the third housing chamber and having the third secured piston arranged therebetween,
- a volume between the first moveable piston and the first end wall of the second chamber portion, a volume between the second moveable piston and the second end wall of the second chamber portion, a volume between the third moveable piston and the first end wall of the third chamber portion, and a volume between the fourth moveable piston and the second end wall of the third chamber portion defining the second set of actuator volumes, and
- a volume between the first moveable piston and the second secured piston, a volume between the second moveable piston and the second secured piston, a volume between the third moveable piston and the third secured piston, and the fourth moveable piston and the third secured piston defining the third set of actuator volumes.

4. The hydraulic actuator of claim 1, wherein:
the housing comprises a first housing portion and a second housing portion, the first housing portion defining a first housing chamber and the second housing portion defining a second housing chamber, the first housing portion being substantially collinear with the second housing portion;
the elongate shaft comprises a first elongate shaft portion disposed within the first housing chamber and a second elongate shaft portion disposed within the second housing chamber, the first elongate shaft portion being substantially collinear with the second elongate shaft portion;
the at least one secured piston comprises a first secured piston coupled to the first elongate shaft portion and in sliding contact with the first housing chamber and a second secured piston coupled to the second elongate shaft portion and in sliding contact with the second housing chamber; and
the set of moveable pistons comprises:
- a first moveable piston moveably disposed on the first elongate shaft portion between the first secured piston and a first end wall of the first housing portion and in sliding contact with the first housing chamber, a second moveable piston moveably disposed on the first elongate shaft portion between the first secured piston and a second end wall of the first housing portion and in sliding contact with the first housing chamber, the first and second moveable pistons having the first secured piston arranged therebetween, a volume between the second secured piston and a first end wall of the second housing portion and a volume between the second secured piston and a second end wall of the second housing portion defining the first set of actuator volumes, a volume between the first secured piston and the first moveable piston, and a volume between the first secured piston and the second moveable piston defining the second set of actuator volumes, and a volume between the first moveable piston and the first end wall of the first housing portion and a volume between the second moveable piston and the second end wall of the first housing portion defining the third set of actuator volumes.

5. The hydraulic actuator of claim 1, wherein the set of moveable pistons further define a fourth set of actuator volumes configured to be disposed in fluid communication with a fourth pressurized fluid source.

6. The hydraulic actuator of claim 5, wherein:

the housing comprises a first housing portion and a second housing portion, the first housing portion defining a first housing chamber and the second housing portion defining a second housing chamber, the first housing portion being substantially parallel to the second housing portion;

the elongate shaft comprises a first elongate shaft portion disposed within the first housing chamber and a second elongate shaft portion disposed within the second housing chamber, the first elongate shaft portion being substantially parallel to the second elongate shaft portion;

the at least one secured piston comprises a first secured piston coupled to the first elongate shaft portion and in sliding contact with the first housing chamber and a second secured piston coupled to the second elongate shaft portion and in sliding contact with the second housing chamber; and the set of moveable pistons comprises:

a first moveable piston moveably disposed on the first elongate shaft portion between the first secured piston and a first end wall of the first housing portion, a second moveable piston moveably disposed on the first elongate shaft portion between the first secured piston and a second end wall of the first housing portion, the first and second moveable pistons in sliding contact with the first housing chamber and having the first secured piston arranged therebetween, a third moveable piston moveably disposed on the second elongate shaft portion between the second secured piston and a first end wall of the second housing portion, a fourth moveable piston moveably disposed on the second elongate shaft portion between the second secured piston and a second end wall of the second housing portion, the third and fourth moveable pistons in sliding contact with the second housing chamber and having the second secured piston arranged therebetween, a volume between the first secured piston and the first moveable piston and a volume between the first secured piston and the second moveable piston defining the first set of actuator volumes, a volume between the first moveable piston and the first end wall of the first housing portion and a volume between the second moveable piston and the second end wall of the first housing portion defining the second set of actuator volumes, a volume between the second secured piston and the third moveable piston and a volume between the second secured piston and the fourth moveable piston defining the third set of actuator volumes, a volume between the third moveable piston and the first end wall of the second housing portion and a volume between the fourth moveable piston and the second end wall of the second housing portion defining the fourth set of actuator volumes.

7. The hydraulic actuator of claim 5, wherein:

the housing comprises a first housing portion, a second housing portion, and a third housing portion, the first housing portion defining a first housing chamber, the second housing portion defining a second housing chamber, and the third housing portion defining a third housing chamber, the first housing portion, the second housing portion and the third housing portion being substantially parallel, the volume defined by the second housing chamber being about one-half of the volume defined by the first housing chamber, and the volume defined by the third housing chamber being about one-half the volume defined by the first housing chamber;

the elongate shaft comprises a first elongate shaft portion disposed within the first housing chamber, a second elongate shaft portion disposed within the second housing chamber, and a third elongate shaft portion disposed within the third housing chamber, the first elongate shaft portion, the second elongate shaft portion, and the third elongate shaft portion being substantially parallel;

the at least one secured piston comprises a first secured piston coupled to the first elongate shaft portion and in sliding contact with the first housing chamber, a second secured piston coupled to the second elongate shaft portion and in sliding contact with the second housing chamber, and a third secured piston coupled to the third elongate shaft portion and in sliding contact with the third housing chamber; and the set of moveable pistons comprises:

a first moveable piston moveably disposed on the first elongate shaft portion between the first secured piston and a first end wall of the first housing portion, a second moveable piston moveably disposed on the first elongate shaft portion between the first secured piston and a second end wall of the first housing portion, the first and second moveable pistons in sliding contact with the first housing chamber and having the first secured piston arranged therebetween, a third moveable piston moveably disposed on the second elongate shaft portion between the second secured piston and a first end wall of the second housing portion, a fourth moveable piston moveably disposed on the second elongate shaft portion between the second secured piston and a second end wall of the second housing portion, the third and fourth moveable pistons in sliding contact with the second housing chamber and having the second secured piston arranged therebetween, a fifth moveable piston moveably disposed on the third elongate shaft portion between the third secured piston and a first end wall of the third housing portion, and a sixth moveable piston moveably disposed on the third elongate shaft portion between the third secured piston and a second end wall of the third housing portion, the fifth and sixth moveable pistons in sliding contact with the third housing chamber and having the third secured piston arranged therebetween, a volume between the first secured piston and the first moveable piston and a volume between the first secured piston and the second moveable piston defining the first set of actuator volumes, a volume between the third moveable piston and the first end wall of the second chamber portion, a volume between the fourth moveable piston and the second end wall of the second chamber portion, a volume between the fifth moveable piston and the first end wall of the third chamber portion, and a volume between the sixth moveable piston and the second end wall of the third chamber portion defining the second set of actuator volumes, a volume between the third moveable piston and the second secured piston, a volume between the fourth moveable piston and the second secured piston, a volume between the fifth moveable piston and the third secured piston, and the sixth moveable piston and the third secured piston defining the third set of actuator volumes, and a volume between the first moveable piston and the first end wall of the first chamber portion and a volume between the second moveable piston and the second end wall of the first housing portion defining the fourth set of actuator volumes.

8. The hydraulic actuator of claim 5, wherein:

the housing comprises a first housing portion and a second housing portion, the first housing portion defining a first housing chamber and the second housing portion defining a second housing chamber, the first housing portion being substantially collinear with the second housing portion;

the elongate shaft comprises a first elongate shaft portion disposed within the first housing chamber and a second elongate shaft portion disposed within the second housing chamber, the first elongate shaft portion being substantially collinear with the second elongate shaft portion;

the at least one secured piston comprises a first secured piston coupled to the first elongate shaft portion and a second secured piston coupled to the second elongate shaft portion; and the set of moveable pistons comprises:

a first moveable piston moveably disposed on the first elongate shaft portion between the first secured piston and a first end wall of the first housing portion, a second moveable piston moveably disposed on the first elongate shaft portion between the first secured piston and a second end wall of the first housing portion, the first and second moveable pistons in sliding contact with the first housing chamber and having the first secured piston arranged therebetween, a third moveable piston moveably disposed on the second elongate shaft portion between the second secured piston and a first end wall of the second housing portion, a fourth moveable piston moveably disposed on the second elongate shaft portion between the second secured piston and a second end wall of the second housing portion, the third and fourth moveable pistons in sliding contact with the second housing chamber and having the second secured piston arranged therebetween, a volume between the first secured piston and the first moveable piston, and a volume between the first secured piston and the second moveable piston defining the first set of actuator volumes, a volume between the third moveable piston and the first end wall of the second housing portion and a volume between the fourth moveable piston and the second end wall of the second housing portion defining the second set of actuator volumes, a volume between the first moveable piston and the first end wall of the first housing portion and a volume between the second moveable piston and the second end wall of the first housing portion defining the third set of actuator volumes, and a volume between the third moveable piston and the second secured piston and a volume between the fourth moveable piston and the second secured piston defining the fourth set of actuator volumes.

9. A hydraulic actuator system, comprising:

a first pressurized fluid source having a first servovalve assembly in fluid communication with the first pressurized fluid source;

a second pressurized fluid source having a second servovalve in fluid communication with the second pressurized fluid source;

a third pressurized fluid source having a third servovalve assembly in fluid communication with the third pressurized fluid source; and the hydraulic actuator of claim 1, wherein the first set of actuator volumes is disposed in fluid communication with the first pressurized fluid source, a second set of actuator volumes is disposed in fluid communication with the second pressurized fluid source, and a third set of actuator volumes is disposed in fluid communication with the third pressurized fluid source.

10. The hydraulic actuator system of claim 9, comprising:

a position sensor coupled to the elongate shaft, the position sensor configured to generate a position signal in response to movement of the elongate shaft between a first position and a second position; and a controller disposed in electrical communication with the position sensor, the controller configured to adjust operation of at least one valve disposed in fluid communication with the hydraulic actuator.

11. The hydraulic actuator system of claim 10, wherein the at least one valve comprises an electrohydraulic servovalve.

12. The hydraulic actuator system of claim 10, wherein the at least one valve comprises a direct drive valve.

13. The hydraulic actuator system of claim 9, wherein the elongate shaft couples to a mounting surface and the housing is configured to move relative to the elongate shaft.

14. The hydraulic actuator system of claim 9, wherein the housing is coupled to a mounting surface and the elongate shaft is configured to move relative to the housing.

15. The hydraulic actuator system of claim 9, comprising a fluid transmission/connection member disposed in fluid communication with at least one of the first pressurized fluid source, the second pressurized fluid source, and the third pressurized fluid source.

16. The hydraulic actuator system of claim 15, wherein the fluid transmission/connection member comprises a linkage assembly having a first channel member, a second channel member, and a hydraulic swivel disposed between the first and second channel members, the first channel member disposed in fluid communication with the at least one of the first pressurized fluid source, the second pressurized fluid source, and the third pressurized fluid source and the second channel member disposed in fluid communication with a channel defined by the elongate shaft and in fluid communication with at least one of the first set of actuator volumes, the second set of actuator volumes, and the third set of actuator volumes.

17. The hydraulic actuator system of claim 15, wherein the fluid transmission/connection member comprises a sliding assembly having a first channel member and a second channel member slidably coupled to the first channel member the first channel member disposed in fluid communication with the at least one of the first pressurized fluid source, the second pressurized fluid source, and the third pressurized fluid source and the second channel member disposed in fluid communication with a channel defined by the elongate shaft and in fluid communication with at least one of the first set of actuator volumes, the second set of actuator volumes, and the third set of actuator volumes.

18. The hydraulic actuator system of claim 9, further comprising a secondary actuator disposed in fluid communication with the at least one of the first pressurized fluid source, the second pressurized fluid source, and the third pressurized fluid source.

19. The hydraulic actuator system of claim 9, comprising a fluid transmission/connection member disposed in fluid communication with at least one of the first pressurized fluid source, the second pressurized fluid source, and the third pressurized fluid source.

20. The hydraulic actuator system of claim 9, further comprising a secondary actuator disposed in fluid communication with the at least one of the first pressurized fluid source, the second pressurized fluid source, and the third pressurized fluid source.

* * * * *